(12) United States Patent
Xu et al.

(10) Patent No.: US 12,493,374 B1
(45) Date of Patent: Dec. 9, 2025

(54) POSITIONING METHOD AND APPARATUS FOR TOUCH AREA, TERMINAL DEVICE, AND STORAGE MEDIUM

(71) Applicant: SHENZHEN HITEVISION TECHNOLOGY CO., LTD., Guangdong (CN)

(72) Inventors: Xiezeng Xu, Guangdong (CN); Shuai Wang, Guangdong (CN); Minghua Zhang, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/877,258

(22) PCT Filed: Dec. 13, 2022

(86) PCT No.: PCT/CN2022/138645
§ 371 (c)(1),
(2) Date: Dec. 19, 2024

(87) PCT Pub. No.: WO2024/087345
PCT Pub. Date: May 2, 2024

(30) Foreign Application Priority Data

Oct. 27, 2022  (CN) .................. 202211329527.X

(51) Int. Cl.
*G06F 3/041* (2006.01)
*G06F 3/044* (2006.01)

(52) U.S. Cl.
CPC .......... *G06F 3/0416* (2013.01); *G06F 3/044* (2013.01)

(58) Field of Classification Search
None
See application file for complete search history.

(56) References Cited

U.S. PATENT DOCUMENTS

2025/0110598 A1* 4/2025 Xu .................. G06F 3/0446

FOREIGN PATENT DOCUMENTS

| CN | 102722285 A | 10/2012 |
| CN | 111381729 A | 7/2020 |
| CN | 112005201 A | 11/2020 |
| CN | 112905034 A | 6/2021 |

(Continued)

OTHER PUBLICATIONS

The International search report for PCT Application No. PCT/CN2022/138645, dated Jun. 23, 2023, 6 pages.

(Continued)

*Primary Examiner* — Stephen T. Reed
(74) *Attorney, Agent, or Firm* — East IP P.C.

(57) ABSTRACT

The present application relates to the field of touch, and in particular, relates to a positioning method and apparatus for a touch area, a terminal device, and a storage medium. The method comprises: determining a first touch area and a second touch area based on differential signals of first sensing units and a preset touch threshold, determining a second sensing unit and a third sensing unit in the first touch area and the second touch area separately, expanding the area where the second sensing unit is located and the area where the third sensing unit is located separately to obtain a third touch area and a fourth touch area, and combining the third touch area and the fourth touch area.

15 Claims, 8 Drawing Sheets

(56) References Cited

FOREIGN PATENT DOCUMENTS

| CN | 113168253 A | 7/2021 |
|---|---|---|
| KR | 20190132315 A | 11/2019 |
| WO | 2021172646 A1 | 9/2021 |

OTHER PUBLICATIONS

The extended European search report dated Aug. 20, 2025 for European Application No. 22963323.5 , 6 pages.

* cited by examiner

POSITIONING METHOD AND APPARATUS FOR TOUCH AREA, TERMINAL DEVICE, AND STORAGE MEDIUM

CROSS REFERENCE TO RELATED APPLICATION

The present application is a national application of International Application No. PCT/CN2022/138645 filed on Dec. 13, 2022, which claims priority to Chinese Patent Application No. 202211329527.X filed on Oct. 27, 2022, and titled "POSITIONING METHOD AND APPARATUS FOR TOUCH AREA, TERMINAL DEVICE, AND STORAGE MEDIUM", both of which are incorporated herein by reference in their entireties.

TECHNICAL FIELD

The present application relates to the field of touch, in particular to a positioning method and apparatus for a touch area, a terminal device, and a storage medium.

BACKGROUND

In existing technologies, there are various touch area positioning methods, and peak point positioning and boundary positioning methods are most commonly used for capacitive touch devices.

The peak point positioning method is inaccurate in identifying large touch points, resulting in relatively low accuracy of touch area positioning results. The boundary positioning method is difficult and inadequate in identifying small touch points, also resulting in relatively low accuracy of touch area positioning results.

SUMMARY

In view of this, embodiments of the present application provide a positioning method and apparatus for a touch area, a terminal device, and a storage medium, which can improve the accuracy of touch area positioning results.

In a first aspect, embodiments of the present application provide a positioning method for a touch area, including:
  obtaining differential signals of first sensing units;
  determining a first touch area and a second touch area based on the differential signals and a preset touch threshold, where the first touch area is an area corresponding to the first sensing units having positive differential signals greater than the touch threshold, and the second touch area is an area corresponding to the first sensing units having negative differential signals with absolute values greater than the touch threshold;
  determining a second sensing unit corresponding to the maximum differential signal in the first touch area, expanding the area where the second sensing unit is located to obtain a third touch area, determining a third sensing unit corresponding to the minimum differential signal in the second touch area, and expanding the area where the third sensing unit is located to obtain a fourth touch area; and
  combining the third touch area and the fourth touch area to obtain a target touch area.

In a possible embodiment of the first aspect, the first sensing units are located in a capacitive sensing array, and the expanding the area where the second sensing unit is located to obtain a third touch area includes:
  determining, based on the position of the second sensing unit in the capacitive sensing array, an expansion direction for expanding the area where the second sensing unit is located;
  expanding in the expansion direction the area where the second sensing unit is located, to obtain an expanded area of the second sensing unit; and
  stopping expanding the area where the second sensing unit is located if the differential signal corresponding to the expanded area of the second sensing unit satisfies a preset expansion stop condition, to obtain the third touch area.

The stopping expanding the area where the second sensing unit is located if the differential signal corresponding to the expanded area of the second sensing unit satisfies a preset expansion stop condition, to obtain the third touch area includes:
  stopping expanding the area where the second sensing unit is located if the differential signal corresponding to the expanded area of the second sensing unit is less than the touch threshold, to obtain the third touch area.

The stopping expanding the area where the second sensing unit is located if the differential signal corresponding to the expanded area of the second sensing unit satisfies a preset expansion stop condition, to obtain the third touch area includes:
  stopping expanding the area where the second sensing unit is located if the differential signal corresponding to the expanded area of the second sensing unit is greater than the touch threshold and the expanded area of the second sensing unit is located within the expanded area of other second sensing unit, to obtain the third touch area.

The area where the second sensing unit is located is expanded in rounds, and the stopping expanding the area where the second sensing unit is located if the differential signal corresponding to the expanded area of the second sensing unit is greater than the touch threshold and the expanded area of the second sensing unit is located within the expanded area of other second sensing unit, to obtain the third touch area includes:
  stopping expanding the area where the second sensing unit is located if the differential signal corresponding to the expanded area of the second sensing unit is greater than the touch threshold, the expanded area of the second sensing unit is located within the expanded area of the other second sensing unit, and a first target differential signal is less than a second target differential signal, to obtain the third touch area, where the first target differential signal is a differential signal corresponding to the last-round expanded area of the second sensing unit, and the second target differential signal is a differential signal corresponding to the last-round expanded area of the other second sensing unit.

The combining the third touch area and the fourth touch area to obtain a target touch area includes:
  pairing the third touch area and the fourth touch area to obtain a paired group of the third touch area and the fourth touch area; and
  combining the third touch area and the fourth touch area in the paired group to obtain the target touch area.

There are a plurality of fourth touch areas, and the pairing the third touch area and the fourth touch area to obtain a paired group of the third touch area and the fourth touch area includes:
  calculating a distance between the third touch area and each of the fourth touch areas; and determining the third touch area and the fourth touch area corresponding to the minimum distance among the distances as the paired group.

In a second aspect, the embodiments of the present application provide a positioning apparatus for a touch area, including:
an obtaining module, configured to obtain differential signals of first sensing units;
a first determination module, configured to determine a first touch area and a second touch area based on the differential signals and a preset touch threshold, where the first touch area is an area corresponding to the first sensing units having positive differential signals greater than the touch threshold, and the second touch area is an area corresponding to the first sensing units having negative differential signals with absolute values greater than the touch threshold;
a second determination module, configured to determine a second sensing unit corresponding to the maximum differential signal in the first touch area, expand the area where the second sensing unit is located to obtain a third touch area, determine a third sensing unit corresponding to the minimum differential signal in the second touch area, and expand the area where the third sensing unit is located to obtain a fourth touch area; and
a combination module, configured to combine the third touch area and the fourth touch area to obtain a target touch area.

In a third aspect, the embodiments of the present application provide a terminal device, including a memory, a processor, and a computer program stored in the memory and executable on the processor, where the processor executes the computer program to implement the positioning method for a touch area according to any embodiment of the first aspect.

In a fourth aspect, the embodiments of the present application provide a computer-readable storage medium, storing a computer program, where the computer program, when executed by a processor, implements the positioning method for a touch area according to any embodiment of the first aspect.

Compared with existing technologies, embodiments of the present application have the following beneficial effects: according to the technical solution of the present application, differential signals of first sensing units are obtained; a first touch area and a second touch area are determined based on the differential signals and a preset touch threshold; a second sensing unit corresponding to the maximum differential signal in the first touch area is determined, the area where the second sensing unit is located is expanded to obtain a third touch area, a third sensing unit corresponding to the minimum differential signal in the second touch area is determined, and the area where the third sensing unit is located is expanded to obtain a fourth touch area; and the third touch area and the fourth touch area are combined to obtain a target touch area. That is, according to the technical solution of the present application, the first touch area and the second touch area are determined based on the differential signals of the first sensing units and the preset touch threshold, the first touch area includes the first sensing units with positive differential signals greater than the touch threshold, and the second touch area includes the first sensing units with negative differential signals with absolute values greater than the touch threshold, so a plurality of first sensing units having differential signals greater than the touch threshold or differential signals with absolute values greater than the touch threshold can be identified; and the target touch area is obtained by combining the third touch area and the fourth touch area, the third touch area is expanded from the second sensing unit corresponding to the maximum differential signal in the first touch area, and the fourth touch area is expanded from the third sensing unit corresponding to the minimum differential signal in the second touch area, so the second sensing unit corresponding to the maximum differential signal in the first touch area and the third sensing unit corresponding to the minimum differential signal in the second touch area can be identified separately, thereby improving the accuracy of touch area positioning results.

BRIEF DESCRIPTION OF THE DRAWINGS

To describe the technical solutions in the embodiments of the present application more clearly, the following briefly introduces the accompanying drawings required for describing the embodiments or the prior art. Apparently, the accompanying drawings in the following description show only some embodiments of the present application, and those of ordinary skill in the art can derive other drawings from the accompanying drawings without any creative efforts.

DETAILED DESCRIPTION

Figure 1:
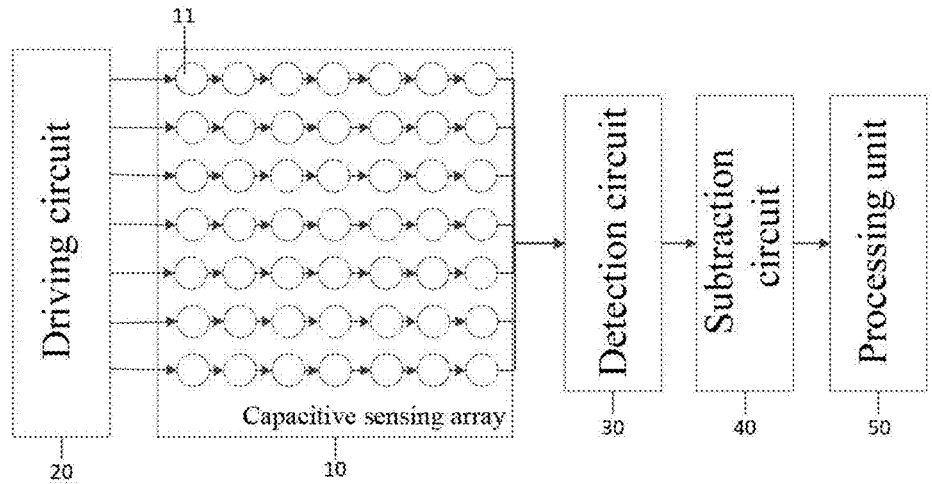
FIG. 1 is a schematic view of an application scenario of a positioning method for a touch area provided in an embodiment of the present application.

In the following description, for the purpose of illustration rather than limitation, specific details such as specific system structures and technologies are provided for a thorough understanding of embodiments of the present application. However, a person skilled in the art should be clear that the present application can also be implemented in other embodiments without these specific details. In other cases, detailed descriptions of well-known systems, apparatuses, circuits, and methods are omitted to avoid unnecessary details hindering the description of the present application. In other cases, specific technical details in various embodiments can be referenced to each other, and specific systems not described in one embodiment can be referenced to other embodiments.

It should be understood that, when used in the description and appended claims of the present application, the term "include" indicates the presence of the described features, wholes, steps, operations, elements, and/or components, but does not exclude the presence or addition of one or more other features, wholes, steps, operations, elements, components, and/or sets thereof.

It should be further understood that, the term "and/or" used in the description and appended claims of the present application refers to and includes any combination or all possible combinations of one or more of the associated listed items.

The reference to "an embodiment of the present application" or "some embodiments" described in the description of the present application means that one or more embodiments of the present application include specific features, structures, or characteristics described in conjunction with the embodiments. Therefore, the statements such as "in other embodiments", "one embodiment of the present application", "other embodiments of the present application" that appear in different places of the present application do not necessarily refer to the same embodiments, but rather imply "one or more but not all embodiments", unless otherwise specifically emphasized. The terms "include", "comprise", "have", and their variants mean "include but not limited to", unless otherwise specifically emphasized.

In addition, in the description and appended claims of the present application, the terms "first", "second", etc. are only used for distinguishing the description and cannot be understood as indicating or implying relative importance.

In existing technologies, there are various methods for positioning touched areas (referred to as touch areas) in a touch screen, and peak point positioning and boundary positioning methods are most commonly used for capacitive touch devices.

Generally, the peak point positioning method is widely used. In the peak point positioning method, a capacitive sensing signal of a sensing unit corresponding to a peak point changes the most, and the sensing unit corresponding to the peak point can reflect a real quantity of capacitive sensing signals. When the peak point positioning method is used for positioning a touch area, capacitive sensing signals of a plurality of sensing units are obtained, a maximum value among the plurality of sensing signals is determined to determine the peak point, and the area where the peak point is located is determined as the touch area.

In the case that the peak point positioning method is used for positioning a touch area, for the case where a small number of sensing units are touched, determining the sensing unit corresponding to the maximum sensing signal among the plurality of sensing signals can identify the touch area corresponding to the small number of sensing units with high identification accuracy.

However, for the case where a plurality of sensing units are touched, the sensing signals of some of the touched sensing units are not the maximum sensing signals, so that some of the plurality of sensing units cannot be identified, resulting in relatively low identification accuracy of the touch area.

In the case that the boundary positioning method is used for positioning a touch area, capacitive sensing signals detected by all sensing units are obtained, and the area enclosed by boundaries of the sensing units with the capacitive sensing signals greater than a touch threshold is determined as the touch area.

In the case that the boundary positioning method is used for identifying the situation where a plurality of sensing units are touched, the capacitive sensing signals detected by all the sensing units are obtained, and the area enclosed by the boundaries of the sensing units with the capacitive sensing signals greater than the touch threshold is determined as the touch area corresponding to the plurality of sensing units. Because the sensing signal corresponding to each of the plurality of sensing units is greater than the touch threshold, the boundary positioning method has high accuracy in identifying the entire area.

However, in the case of identifying the situation where a small number of sensing units are touched, the boundary positioning method can only identify the overall touch area formed by a small number of touch points, but cannot separately identify the touch area corresponding to each touch point. Therefore, the boundary positioning method has relatively low accuracy in identifying individual touch areas at short distances.

In order to address the aforementioned problems, the inventive concept of the present application is as follows.

The present application can determine a first touch area and a second touch area based on differential signals of first sensing units and a preset touch threshold, determine a second sensing unit and a third sensing unit in the first touch area and the second touch area respectively, expand the area where the second sensing unit is located and the area where the third sensing unit is located respectively to obtain a third touch area and a fourth touch area, and combine the third touch area and the fourth touch area to obtain a target touch area. That is, according to the technical solution of the present application, the first touch area and the second touch area are determined based on the differential signals of the first sensing units and the preset touch threshold, the first touch area includes the first sensing units having positive differential signals greater than the touch threshold, and the second touch area includes the first sensing units having negative differential signals with absolute values greater than the touch threshold, so a plurality of first sensing units having differential signals greater than the touch threshold or differential signals with absolute values greater than the touch threshold can be identified; and the target touch area is obtained by combining the third touch area and the fourth touch area, the third touch area is expanded from the second sensing unit corresponding to the maximum differential signal in the first touch area, and the fourth touch area is expanded from the third sensing unit corresponding to the minimum differential signal in the second touch area, so the second sensing unit corresponding to the maximum differential signal in the first touch area and the third sensing unit corresponding to the minimum differential signal in the second touch area can be identified respectively, thereby improving the accuracy of touch area positioning results.

To illustrate the technical solution of the present application, specific embodiments are provided below.

Referring to FIG. 1, which is a schematic view of an application scenario of a positioning method for a touch area provided in an embodiment of the present application. For the convenience of explanation, only parts related to the present application are shown. The application scenario includes, but is not limited to: a capacitive sensing array 10, a driving circuit 20, a detection circuit 30, a subtraction circuit 40, and a processing unit 50. An output terminal of the driving circuit 20 is electrically connected to an input terminal of the capacitive sensing array 10, an output terminal of the capacitive sensing array 10 is electrically connected to an input terminal of the detection circuit 30, an output terminal of the detection circuit 30 is electrically connected to an input terminal of the subtraction circuit 40, and an output terminal of the subtraction circuit 40 is electrically connected to an input terminal of the processing unit 50.

The capacitive sensing array 10 includes a plurality of sensing units 11 arranged in rows and columns, and each sensing unit 11 includes a first electrode (such as a driving electrode) and a second electrode (such as a receiving electrode). When a voltage signal is provided to the first electrode, an electric field is generated and a coupling capacitance is formed between the first electrode and the second electrode. The first electrode and the second electrode in the embodiments of the present application can be appropriately configured without specific limitations, as long as they can form a specific coupling capacitance.

The driving circuit 20 is a signal generator that can emit a driving signal to the first electrode of the sensing unit 11. The driving signal in the embodiments of the present application may be a time-varying signal, such as a periodic signal. In other embodiments, the driving signal may be a pulse signal, such as a square wave or a triangular wave. The embodiments of the present application do not limit the type of the pulse signal. The driving signal may be coupled with a detection signal by the coupling capacitance to the second electrode of the sensing unit 11.

A plurality of driving circuits 20 may be configured in the embodiments of the present application and provide a driving signal for each row of sensing units 11 in the capacitive sensing array 10 respectively. The plurality of driving circuits 20 may drive the sensing units 11 in sequence or in parallel.

The detection circuit 30 is coupled to the capacitive sensing array 10 and configured to modulate detection signals generated by a plurality of sensing units 11 in each row to generate modulated detection signals. The modulation is used for changing the amplitude, frequency, or phase of the detection signals generated by the plurality of sensing units 11.

The subtraction circuit 40 is configured to perform a subtraction operation on the modulated detection signals to generate differential signals. For example, in embodiments of the present application, the capacitive sensing array 10 includes a total of 49 sensing units 11 in 7 rows and 7 columns, and the subtraction circuit 40 is configured to subtract the modulated detection signals generated by the first row and second column of sensing units 11 from the modulated detection signals generated by the first row and first column of sensing units 11 to obtain differences as differential signals of the first row and first column of sensing units 11, and to subtract the modulated detection signals generated by the first row and third column of sensing units 11 from the modulated detection signals generated by the first row and second column of sensing units 11 to obtain differences as differential signals of the first row and second column of sensing units 11. Differential signals of 49 sensing units are obtained using this method.

The processing unit 50 may be a central processing unit (CPU), or other general-purpose processor, digital signal processor (DSP), application specific integrated circuit (ASIC), field-programmable gate array (FPGA), or other programmable logic device, discrete gate or transistor logic device, discrete hardware component, or the like. The general-purpose processor may be a microprocessor, or the processor may be any conventional processor or the like.

The processing unit 50 is configured to obtain differential signals of first sensing units; determine a first touch area and a second touch area based on the differential signals and a preset touch threshold; determine a second sensing unit corresponding to the maximum differential signal in the first touch area, expand the area where the second sensing unit is located to obtain a third touch area, determine a third sensing unit corresponding to the minimum differential signal in the second touch area, and expand the area where the third sensing unit is located to obtain a fourth touch area; and combine the third touch area and the fourth touch area to obtain a target touch area.

In other embodiments, more or fewer components than the example shown in FIG. 1 may be included, or some components or different components may be may be combined. FIG. 1 is only an exemplary description and cannot be interpreted as a specific limitation of the present application. For example, an analog-to-digital converter, an encoder, a decoder, and the like may be further included.

Figure 2:
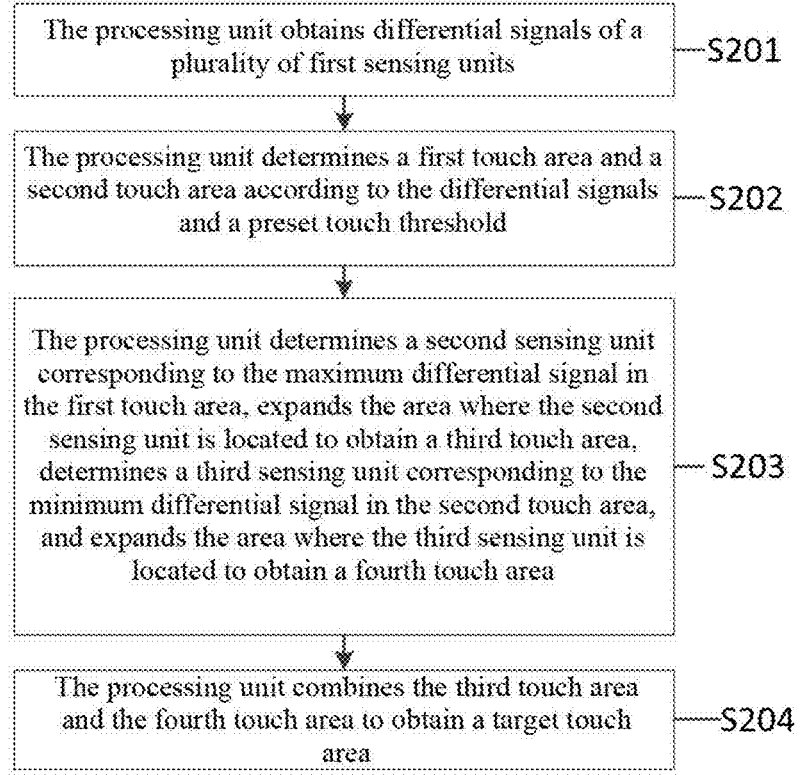
FIG. 2 is a schematic flowchart of a positioning method for a touch area provided in an embodiment of the present application.

Refer to FIG. 2, which is a schematic flowchart of a positioning method for a touch area provided in an embodiment of the present application. An executive subject of the method in FIG. 2 may be the processing unit in FIG. 1. As shown in FIG. 2, the method includes: S201 to S204.

S201: The processing unit obtains differential signals of first sensing units.

Specifically, the subtraction circuit inputs the generated differential signals to the processing unit, and the processing unit can obtain the differential signals of the first sensing units.

The embodiments of the present application perform arithmetic processing on the differential signals to obtain a target touch area, in order to effectively eliminate external noise interference.

According to the principle of capacitive touch sensing (which is known and will not be repeated here), detecting whether an object is close to a sensing unit means determining the charge change of the sensing unit to detect whether the object (such as, but not limited to, fingers, water droplets, or metal) touches the sensing unit.

The detection signal of the sensing unit touched by the object has the largest change relative to the sensing unit not touched, and the changes in the detection signals of the sensing units around the sensing unit touched by the object are smaller than the change in the detection signal of the sensing unit touched by the object.

Figure 3:
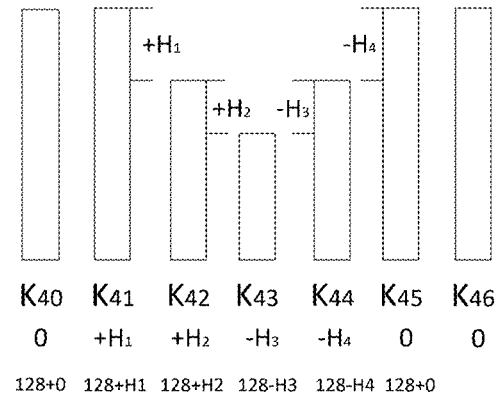
FIG. 3 is a view of an example of obtaining differential signals provided in an embodiment of the present application.

For example, referring to FIG. 3, which is a view of an example of obtaining differential signals provided in an embodiment of the present application.

FIG. 3 shows modulated detection signals generated by the sensing units K40, K41, K42, K43, K44, K45, and K46 in the fourth row of the capacitive sensing array. The height of each rectangular box in FIG. 3 represents the value of the detection signal. The sensing unit touched by the object is K43, and the detection signal of K43 has the largest change, so the value of the detection signal of K43 is the smallest; K40, K41, K45, and K46 are far away from K43, so they are not affected by object touch, and the detection signals of K40, K41, K45, and K46 are not changed; and K42 and K44 are close to K43 and are easily affected by object touch, so the values of the detection signals of K42 and K44 are located between the values of the detection signals of K43 and K40.

The differential signal refer to difference between the detection signals obtained by subtraction. Therefore, the obtained differential signal of the first sensing unit is 0 in the case that the detection signal is not changed. For example, the detection signal of K41 is subtracted from the detection signal of K40 to obtain 0, and the detection signal of K46 is subtracted from the detection signal of K45 to obtain 0, that is, the differential signals of K40 and K45 are both 0.

When the difference obtained by subtraction is positive, the obtained differential signal of the first sensing unit is positive. When the difference obtained by subtraction is negative, the obtained differential signal of the first sensing unit is negative. For example, the detection signal of K42 is subtracted from the detection signal of K41 to obtain $+H_1$, the detection signal of K43 is subtracted from the detection signal of K42 to obtain $+H_2$, the detection signal of K44 is subtracted from the detection signal of K43 to obtain $-H_3$, and the detection signal of K45 is subtracted from the detection signal of K44 to obtain $-H_4$. That is, the differential signal of K41 is $+H_1$, the differential signal of K42 is $+H_2$, the differential signal of K43 is $-H_3$, and the differential signal of K44 is $-H_4$.

In some embodiments, a reference signal is stored in a memory, the reference signal may be referred to as an ideal value, and the reference signal represents a detection signal when the sensing units are not touched. For example, the reference signal is any value from 0 bit to 255 bits, such as 128 bits.

In some embodiments, the processing unit adds the reference signal to the differential signals obtained by the subtraction circuit to obtain the differential signals of the first sensing units. For example, the differential signals include, but are not limited to, $128+H_1$, $128+H_2$, $128-H_3$, $128-H_4$, and $128+0$.

In the embodiments of the present application, the reference signal is stored in the memory, and the reference signal is added to the differential signals obtained by the subtraction circuit because the processing circuit obtains the signals transmitted by a high-speed, full duplex, synchronous communication bus (Serial Peripheral Interface, SPI), where the values of the signals transmitted by SPI are 0 to 255 bits. If the signals transmitted by SPI are directly provided, the processing circuit cannot identify the polarity of the signals, so the reference signal is added to the differential signals. The differential signals greater than the reference signal are positive, and the differential signals less than the reference signal are negative.

In other embodiments, the reference signal is stored in the memory, and the reference signal is added to the differential signals obtained by the subtraction circuit is to eliminate inherent noise in the signals and improve the accuracy of arithmetic processing on the differential signals.

In the embodiments of the present application, the term "first" of the first sensing unit is only used for distinguishing and describing from the sensing units in other embodiments, and cannot be understood as indicating or implying relative importance.

S202: The processing unit determines a first touch area and a second touch area based on the differential signals and a preset touch threshold.

Specifically, the first touch area is an area corresponding to the first sensing units having positive differential signals greater than the touch threshold, and the second touch area is an area corresponding to the first sensing units having negative differential signals with absolute values greater than the touch threshold.

In the embodiments of the present application, the method for determining the first touch area and the second touch area is as follows.

Firstly, the first sensing units having positive differential signals greater than the touch threshold and the first sensing units having negative differential signals with absolute values greater than the touch threshold are determined.

Specifically, the touch threshold in the embodiments of the present application is TH, for example, TH=12. If $+H_1$ and $+H_2$ are both greater than 12, the sensing units corresponding to $+H_1$ and $+H_2$ are determined as the first sensing units having positive differential signals greater than the touch threshold.

For another example, if the obtained differential signals are $128+H_1$ and $128+H_2$, the difference between the $128+H_1$ and the reference value 128 and the difference between the $128+H_2$ and the reference value 128 are calculated. If $128+H_1$ and $128+H_2$ are greater than 12, the sensing units corresponding to $128+H_1$ and $128+H_2$ are determined as the first sensing units having positive differential signals greater than the touch threshold.

In the embodiments of the present application, if $|-H_3|$ and $|-H_4|$ are greater than 12, the sensing units corresponding to $-H_3$ and $-H_4$ are determined as the first sensing units having negative differential signals with absolute values greater than the touch threshold.

For another example, if the obtained differential signals are $128-H_3$ and $128-H_4$, the absolute values $|-H_3|$ and $|-H_4|$ of the differences between the $128-H_3$ and the reference value 128 and between the $128-H_4$ and the reference value 128 are calculated. If $|-H_3|$ and $|-H_4|$ are greater than 12, the sensing units corresponding to $128-H_3$ and $128-H_4$ are determined as the first sensing units having negative differential signals with absolute values greater than the touch threshold.

Secondly, the first touch area is determined based on the first sensing units having positive differential signals greater than the touch threshold, and the second touch area is determined based on the first sensing units having negative differential signals with absolute values greater than the touch threshold.

Specifically, the method for determining the first touch area is as follows.

Firstly, row and column numbers of the first sensing units having positive differential signals greater than the touch threshold are determined, and row and column numbers of the first sensing unit having negative differential signals with absolute values greater than the touch threshold are determined.

Figure 4:
FIG. 4 is a view of an example of encoding sensing units provided in an embodiment of the present application.

In the case that the row and column numbers are determined in the embodiments of the present application, the sensing units in the sensing unit array can be encoded in advance, as shown in FIG. 4. FIG. 4 is a view of an example of encoding sensing units provided in an embodiment of the present application. In FIG. 4, K11 represents the sensing unit located at the first row and first column, K12 represents the sensing unit located at the first row and second column, K21 represents the sensing unit located at the second row and first column, and Knm represents the sensing unit located at the nth row and mth column.

For example, the first sensing units having positive differential signals greater than the touch threshold are sensing units in area A, encoded as K22, K23, K31, K32, K33, K42, and K43, and the determined row and column numbers of the corresponding first sensing units having positive differential signals are the second row, third row, fourth row, and the first column, second column, and third column. Firstly, the method for determining row and column numbers of the first sensing units having negative differential signals with absolute values greater than the touch threshold is the same as that for determining the row and column numbers of the first sensing units having positive differential signals greater than the touch threshold, and will not be repeated here.

Secondly, the first touch area is determined based on the row and column numbers of the first sensing units having positive differential signals greater than the touch threshold, and the second touch area is determined based on the row and column numbers of the first sensing units having negative differential signals with absolute values greater than the touch threshold.

Figure 5:
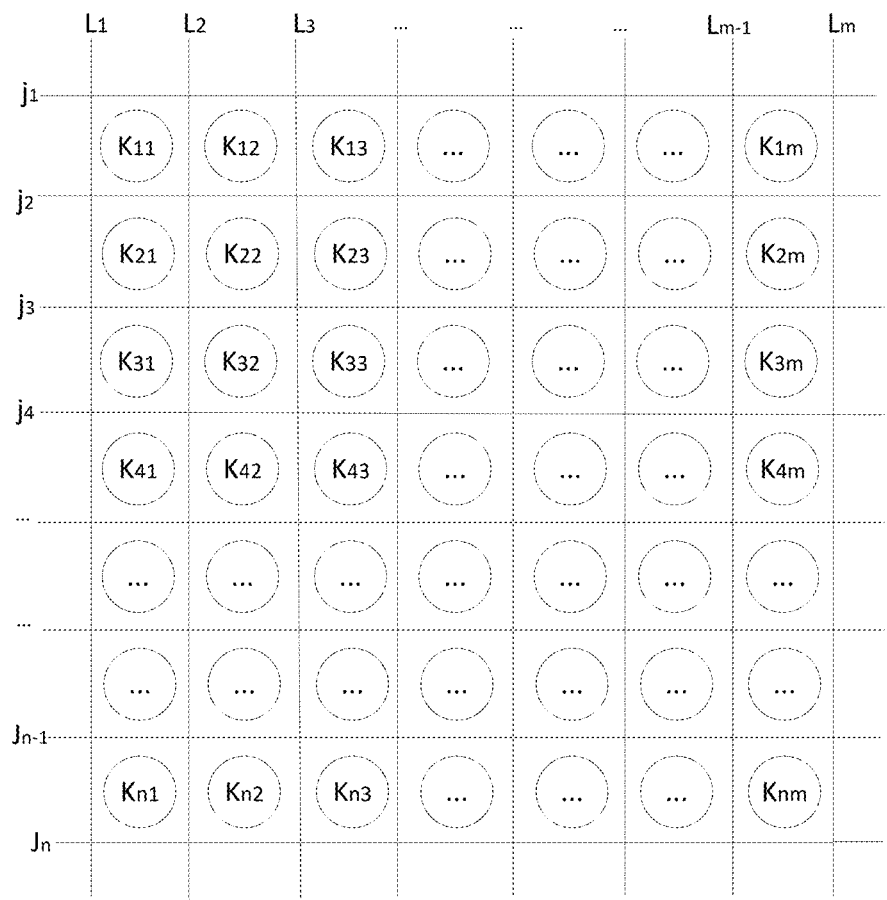
FIG. 5 is an exemplary view of row and column boundary lines provided in an embodiment of the present application.

In the embodiments of the present application, when sensing units are configured in the capacitive sensing array, the distances between sensing units in each row and each column may be the same or different. The embodiments of the present application use the same distances as an example for illustration. When the distances are the same, positions of lines connecting midpoints of the distances between the adjacent sensing units may be used as boundary lines of the rows and columns, as shown in FIG. 5. FIG. 5 is an exemplary view of row and column boundary lines provided in an embodiment of the present application.

In FIG. 5, the method for determining column boundaries of the capacitive sensing array is as follows.

After configuring each sensing unit based on the distance, the processing unit calculates midpoint positions of K11 and K12, K21 and K22, K31 and K32, etc. based on the positions of the sensing units in the first column and the sensing units in the second column, and determines a right boundary L2 of the first column, a right boundary L3 of the second column, and a right boundary L(m−1) of the (m−1)th column based on the midpoint positions. A left boundary of the first column and a right boundary of the mth column in FIG. 5 can be determined by the following method.

The processing unit calculates the distance between the right boundary of the first column and the right boundary of the second column, and determines the left boundary of the first column and the right boundary of the mth column based on the distance between the right boundary of the first column and the right boundary of the second column.

In the embodiments of the present application, the method for determining row boundaries of the capacitive sensing array is the same as that for determining the column boundaries of the capacitive sensing array, and will not be repeated here.

In the embodiments of the present application, the area enclosed by the correspondingly numbered rows and columns of the first sensing units having positive differential signals greater than the touch threshold is determined as the first touch area. For example, the upper boundary of the second row is taken as the upper boundary of the first touch area, the lower boundary of the fourth row is taken as the lower boundary of the first touch area, the left boundary of the first column is taken as the left boundary of the first touch area, and the right boundary of the third column is taken as the right boundary of the first touch area. Then, the first touch area, such as area B in FIG. 4, can be determined.

In the embodiments of the present application, the method for determining the second touch area is the same as that for determining the first touch area, and will not be repeated here.

Step S203: The processing unit determines a second sensing unit corresponding to the maximum differential signal in the first touch area, expands the area where the second sensing unit is located to obtain a third touch area, determines a third sensing unit corresponding to the minimum differential signal in the second touch area, and expands the area where the third sensing unit is located to obtain a fourth touch area.

In the embodiments of the present application, the processing unit selects the sensing unit corresponding to the maximum differential signal from the differential signals of the sensing units in the first touch area as the second sensing unit.

Specifically, the processing unit selects the sensing unit corresponding to the maximum differential signal from the differential signals of the sensing units in the first touch area, including selecting a first differential signal from the differential signals of the sensing units in the first touch area as the maximum differential signal, where the first differential signal is any differential signal among the differential signals of the sensing units. A second differential signal is randomly or sequentially selected for comparison with the first differential signal, where the second differential signal is a signal except the first differential signal among the differential signals of the sensing units.

If the second differential signal is greater than the first differential signal, the second differential signal is taken as the maximum differential signal, and if the second differential signal is less than the first differential signal, the first differential signal is taken as the maximum differential signal until the differential signals of the sensing units all are compared.

Figure 6:
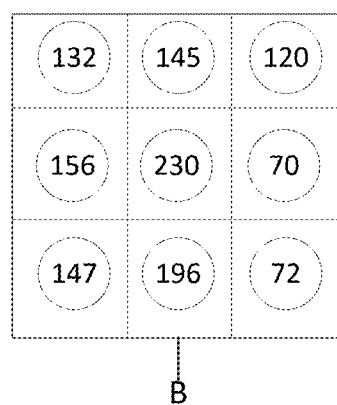
FIG. 6 is an exemplary view of a second sensing unit provided in an embodiment of the present application.

For example, refer to FIG. 6, which is an exemplary view of a second sensing unit provided in an embodiment of the present application. B represents the first touch area.

The processing unit first selects the first differential signal 132 from the differential signals of the sensing units in area B as the maximum differential signal. Next, 145 is selected for comparison with 132, 145−128=17>132−128=4, 145 is taken as the maximum differential signal, then 120 is selected for comparison with 145, 120−128=−8<145−128=17, 145 is taken as the maximum differential signal, the remaining differential signals in area B are compared, and 230 is finally determined as the maximum differential signal.

In the embodiments of the present application, the characteristics of the differential signal of the second sensing unit are as follows: the difference between the differential signal of the second sensing signal and the reference signal is greater than the difference between the sensing signal except the second sensing signal in the first touch area and the reference signal, and is greater than the touch threshold.

In the embodiments of the present application, the method for determining the third sensing unit corresponding to the minimum differential signal in the second touch area is the same as that for determining the second sensing unit corresponding to the maximum differential signal in the first touch area, and will not be repeated here.

The methods provided in the embodiments of the present application for determining the second sensing unit corresponding to the maximum differential signal in the first touch area and the third sensing unit corresponding to the minimum differential signal in the second touch area can quickly and accurately position the touched second sensing unit in the first touch area and the touched third sensing unit in the second touch area, thereby further improving the efficiency and accuracy of positioning the target touch area.

Figure 7:
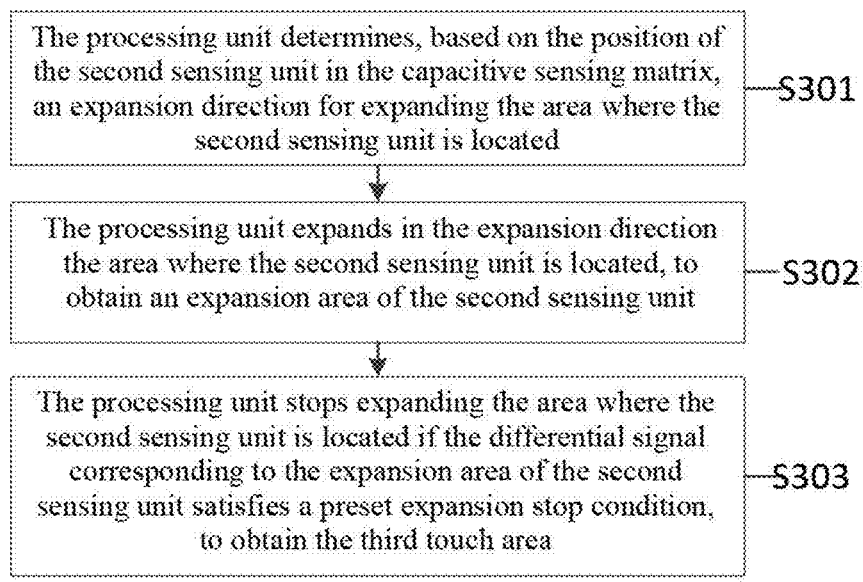
FIG. 7 is a schematic flowchart of a method for obtaining a third touch area provided in an embodiment of the present application.

In the embodiments of the present application, reference is made to FIG. 7 for the method for expanding the area where the second sensing unit is located. FIG. 7 is a schematic flowchart of a method for obtaining a third touch area provided in an embodiment of the present application. An executing entity of the method in FIG. 7 may be the processing unit in FIG. 1. As shown in FIG. 7, the method includes: S301 to S304.

S301: The processing unit determines, based on the position of the second sensing unit in the capacitive sensing array, an expansion direction for expanding the area where the second sensing unit is located.

Specifically, the position of each sensing unit in the capacitive sensing array is pre-stored in the processing unit. After the processing unit determines the second sensing unit, the position of the second sensing unit in the capacitive sensing array is determined accordingly.

In some embodiments, the processing unit may determine the position of the second sensing unit in the capacitive sensing array based on the row and column numbers of the second sensing unit.

For example, the position of the second sensing unit in the capacitive sensing array is K22.

In the embodiments of the present application, after the position of the second sensing unit in the capacitive sensing array is determined, a vertically upward direction, a vertically downward direction, a horizontally left direction, and a horizontally right direction of the second sensing unit can be determined as the expansion direction.

For example, referring to FIG. 5, after the position K22 of the second sensing unit in the capacitive sensing array is determined, the vertically upward direction, vertically downward direction, horizontally left direction, and horizontally right direction of K22 can be determined as the expansion directions. That is, K12 in the vertically upward direction of K22 is taken as a to-be-expanded capacitive sensing array, K32 to Kn2 in the vertically downward direction of K22 are taken as a to-be-expanded capacitive sensing array, K21 in the horizontally left direction of K22 is taken as a to-be-expanded capacitive sensing array, and K23 to K2m in the horizontally right direction of K22 are taken as a to-be-expanded capacitive sensing array.

S302: The processing unit expands in the expansion direction the area where the second sensing unit is located, to obtain an expanded area of the second sensing unit.

Specifically, when the processing unit expands in the expansion direction the area where the second sensing unit is located, the processing unit expands in rounds and in expansion directions the area where the second sensing unit is located, where the expanded area in each round in each expansion direction includes an area where only one sensing unit is located. In some embodiments, the processing unit simultaneously expands in rounds and in expansion directions the area where the second sensing unit is located. For example, when the second sensing unit is K22, the expansion is made in all the four directions in the first round simultaneously, and thus K22 is expanded to K12 in the vertically upward direction, K22 is expanded to K32 in the vertically downward direction, K22 is expanded to K21 in the horizontally left direction, and K22 is expanded to K23 in the horizontally right direction.

In the first round of expansion, if the differential signal corresponding to the expanded area K12 in the vertically upward direction of K22 satisfies a preset expansion stop condition, the expansion of K22 in the vertically upward direction is stopped, and in the second round of expansion, expansion is performed simultaneously in only the vertically downward direction, the horizontally left direction, and the horizontally right direction until the expansions in all the four directions are stopped, to obtain the expanded areas of the second sensing unit.

In other embodiments, the method for the processing unit to simultaneously expand in rounds and in each expansion direction the area where the second sensing unit is located further includes:

the processing unit simultaneously expands in rounds and in each expansion direction the areas where a plurality of second sensing units is located.

Specifically, when the processing unit simultaneously expands in rounds and in each expansion direction the areas where the plurality of second sensing units are located, time at which the plurality of second sensing units start expanding may be the same or different.

For example, the plurality of second sensing units include: a second sensing unit A and a second sensing unit B. For the second sensing unit A and the second sensing unit B, the areas where the second sensing units are located may be simultaneously expanded in rounds in each expansion direction at the same time or at different time.

In some embodiments, the processing unit expands, in rounds and in expansion directions each in a preset expansion order, the area where the second sensing unit is located. The preset expansion order may be vertically upward, then vertically downward, then horizontally left, and then horizontally right. Alternatively the preset expansion order may be vertically downward, then vertically upward, then horizontally left, and then horizontally right. The embodiments of the present application do not limit the specific preset expansion order.

In the embodiments of the present application, the preset expansion order is vertically upward, vertically downward, horizontally left, and horizontally right as an example for illustration.

For example, in the first round of expansion, the processing unit expands the area where the second sensing unit is located in the expansion directions each in the preset expansion order of vertically upward direction, then vertically downward direction, then horizontally left direction, and then horizontally right direction. For example, when the second sensing unit is K22, K22 is first expanded to K12 in the vertically upward direction, K22 is then expanded to K32 in the vertically downward direction, K22 is next expanded to K21 in the horizontally left direction, and K22 is finally expanded to K23 in the horizontally right direction.

In the first round of expansion, if the differential signal corresponding to the expanded area K12 in the vertically upward direction of K22 satisfies the preset expansion stop condition, the expansion of K22 in the vertically upward direction is stopped, and in the second round of expansion, expansion is performed in three directions based on the expansion order of vertically downward, horizontally left, and horizontally right until the expansions in all the four directions are stopped, to obtain the expanded areas of the second sensing unit.

In other embodiments, the method for the processing unit to expand in rounds, in each expansion direction and in a preset expansion order the area where the second sensing unit is located, further includes:

the processing unit expands in rounds, in each expansion direction and in the preset expansion order, the areas where the plurality of second sensing units are located, where the time at which the plurality of second sensing units start expanding may be the same or different.

For example, the plurality of second sensing units include: a second sensing unit A and a second sensing unit B. For the second sensing unit A and the second sensing unit B, the areas where the plurality of second sensing units are located may be expanded in rounds and in expansion directions each in a preset expansion order at the same time or at different time. In other embodiments, expanding the area where the second sensing unit is located includes expanding boundaries of the area where the second sensing unit is located, such as expanding row and column boundaries of the area where the second sensing unit is located. The method and direction for expanding the boundaries of the area where the second sensing unit is located are the same as those for expanding the area where the first sensing unit is located, and will not be repeated here. S303: The processing unit stops expanding the area where the second sensing unit is located if the differential signal corresponding to the expanded area of the second sensing unit satisfies a preset expansion stop condition, to obtain the third touch area.

Specifically, a method provided in the embodiments of the present application for stopping expanding the area where the second sensing unit is located is follows:

stopping expanding the area where the second sensing unit is located if the differential signal corresponding to the expanded area of the second sensing unit is less than the touch threshold, to obtain the third touch area.

Figure 8:
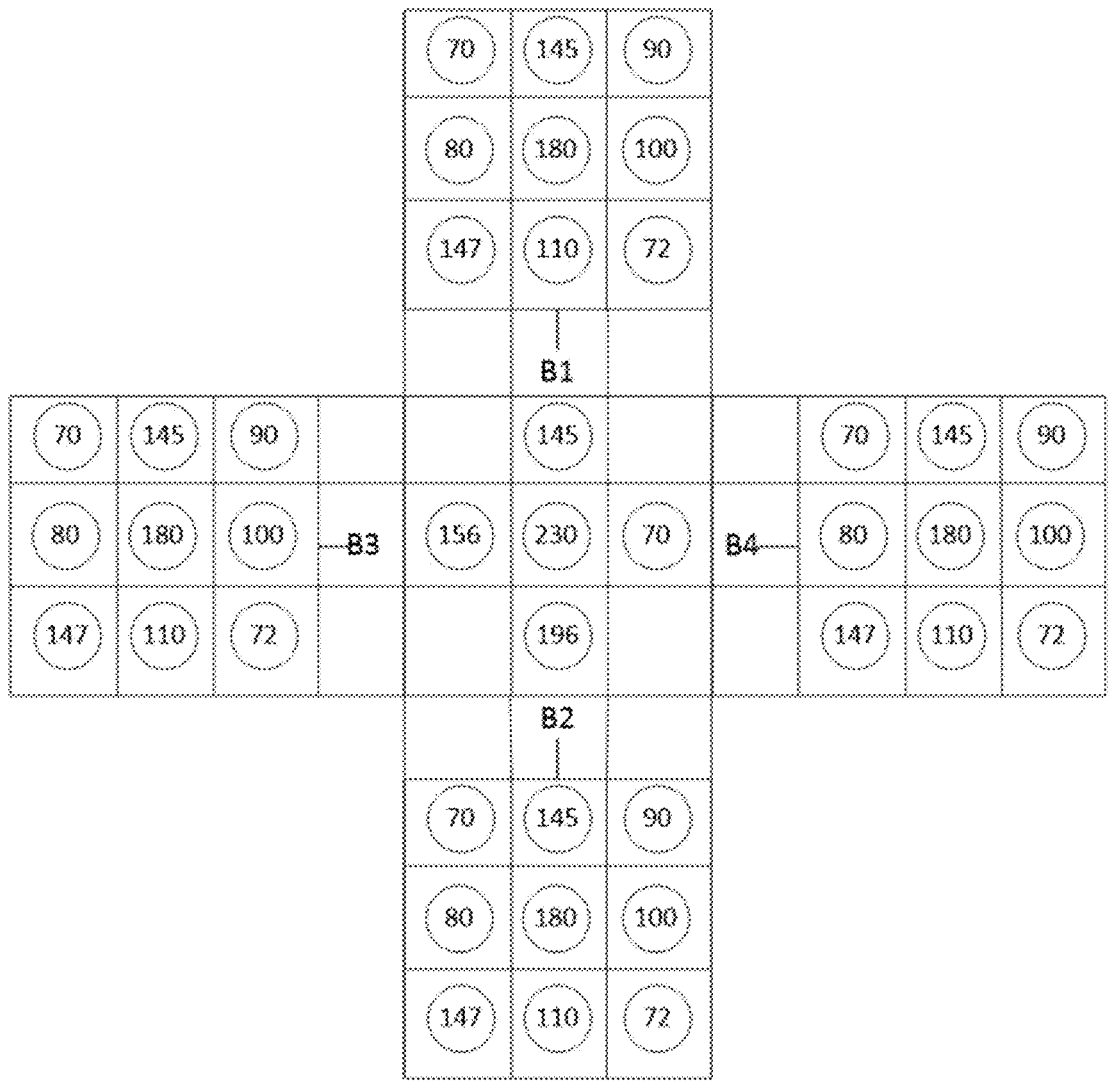
FIG. 8 is a view of an example of stopping expanding the area where the second sensing unit is located provided in an embodiment of the present application.

For example, refer to FIG. 8, which is a view of an example of stopping expanding the area where the second sensing unit is located provided in an embodiment of the present application. The touch threshold in the embodiment of the present application is TH, for example TH=12.

In FIGS. 8, B1, B2, B3, and B4 represent expanded areas of the second sensing unit that have completed the expansion, and the to-be-expanded area where the second sensing unit is located is an area corresponding to 230. The area where the second sensing unit is located is expanded in the first round. If the differential signal in the vertically upward direction is H=145−128=17>TH and is not within the range of boundaries of expanded areas B1 of other second sensing units or boundaries of areas adjacent to expanded area B1, the upper boundary of the area where the second sensing unit is located is expanded in the next round until the differential signal in the vertically upward direction is less than the touch threshold, then the expansion of the upper boundary of the area where the second sensing unit is located is stopped, and the upper boundary is determined.

If the differential signal in the vertically downward direction is H=196−128=68>TH and is not within the range of boundaries of expanded areas B2 of other second sensing units or boundaries of areas adjacent to expanded area B2, the lower boundary of the area where the second sensing unit is located is expanded in the next round until the differential signal in the vertically downward direction is less than the touch threshold, then the expansion of the lower boundary of the area where the second sensing unit is located is stopped, and the lower boundary is determined.

If the differential signal in the horizontal left direction is H=156−128=28>TH and is not within the range of boundaries of expanded areas B3 of other second sensing units or boundaries of areas adjacent to expanded area B3, the left boundary of the area where the second sensing unit is located is expanded in the next round until the differential signal in the horizontal left direction is less than the touch threshold, then the expansion of the left boundary of the area where the second sensing unit is located is stopped, and the left boundary is determined.

If the differential signal in the horizontal right direction is H=70−128=−58<TH, the extension of the right boundary of the area where the second sensing unit is located is stopped, and the right boundary is determined.

Specifically, a method provided in another embodiment of the present application for stopping expanding the area where the second sensing unit is located is follows:

stopping expanding the area where the second sensing unit is located if the differential signal corresponding to the expanded area of the second sensing unit is greater than the touch threshold and the expanded area of the second sensing unit is located within the expanded area of other second sensing unit, to obtain the third touch area.

Figure 9:
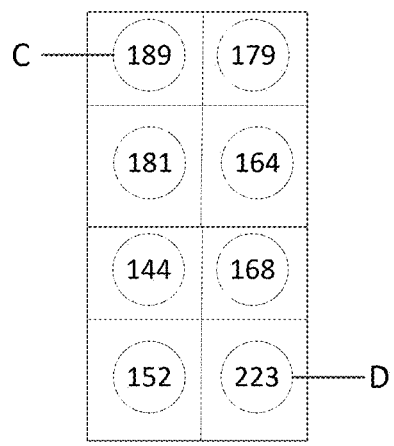
FIG. 9 is a view of another example of stopping expanding the area where the second sensing unit is located provided in an embodiment of the present application.

For example, refer to FIG. 9, which is a view of an example of stopping expanding the area where the second sensing unit is located provided in an embodiment of the present application. The area where the second sensing unit is located includes an area corresponding to 189 (for the convenience of description, the area corresponding to 189 is referred to as area C in the embodiment of the present application) and an area corresponding to 223 (the area corresponding to 223 is referred to as area D in the embodiment of the present application). Area C is expanded in the first round, and its lower boundary is expanded to the lower boundary of an area corresponding to 181. Area D is expanded in the first round, and its upper boundary is expanded to the upper boundary of an area corresponding to 168.

When area C is expanded in the second round, the differential signal of the second-round expanded area of area C is H=144−128=16>TH, but the second-round expanded area is already within the boundary of area D, the differential signal of the second-round expanded area of area C is greater than the touch threshold, and the expanded area of the second sensing unit is located within the expanded area of other second sensing units, so the expansion of area C is stopped, the boundary cannot be further expanded, and finally, the lower boundary of area C is the lower boundary of the area corresponding to 181.

Specifically, a method provided in another embodiment of the present application for stopping expanding the area where the second sensing unit is located is follows:

stopping expanding the area where the second sensing unit is located if the differential signal corresponding to the expanded area of the second sensing unit is greater than the touch threshold, the expanded area of the second sensing unit is located within the expanded area of the other second sensing unit, and a first target differential signal is less than a second target differential signal, to obtain the third touch area, where the first target differential signal is a differential signal corresponding to the last-round expanded area of the second sensing unit, and the second target differential signal is a differential signal corresponding to the last-round expanded area of the other second sensing unit.

Figure 10:
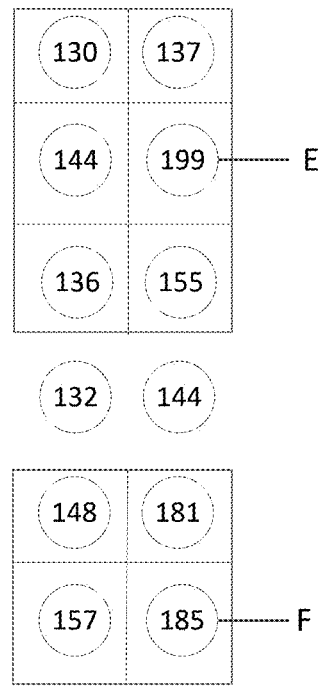
FIG. 10 is a view of yet another example of stopping expanding the area where the second sensing unit is located provided in an embodiment of the present application.

For example, refer to FIG. 10, which is a view of another example of stopping expanding the area where the second sensing unit is located provided in an embodiment of the present application. The second sensing areas include an area corresponding to 199 (the area corresponding to 199 is referred to as area E in the embodiment of the present application) and an area corresponding to 185 (the area corresponding to 185 is referred to as area F in the embodiment of the present application), and both area E and area F are expanded. In the first round of expansion, the lower boundary of area E is expanded to the lower boundary of an area corresponding to 155, and the upper boundary of area F is expanded to the upper boundary of an area corresponding to 181.

During the second round of expansion, the differential signal H=144−128=16>TH of the second-round expanded area of area E is not located within the first-round expanded area of area F, but the second-round expanded area of area E is an area adjacent to the first-round expanded area of area F (an area to which area F is to be expanded in the second round), the differential signal corresponding to the last-round expanded area of the second-round expanded area of area E (the first-round expanded area of area E) is H=155−128=27>TH, the differential signal corresponding to the last-round expanded area of the second-round expanded area of area F (the last-round expanded area of the other second sensing unit) is H=181−128=53, and 27<53.

Therefore, the second-round expanded area of area E satisfies the condition that the differential signal corresponding to the expanded area of the second sensing unit is greater than the touch threshold, the expanded area of the second sensing unit is located within the expanded areas of other second sensing units, and the first target differential signal is less than the second target differential signal, the second expansion of the area where the second sensing unit is located is stopped, and the boundary cannot be further expanded. The lower boundary of area E ends at the lower boundary of the area corresponding to 155, while the upper boundary of area F can be expanded to the upper boundary of an area corresponding to 144 (the second-round expanded area of the other second sensing unit).

The reason why the upper boundary of area F can be expanded to the upper boundary of the area corresponding to 144 is as follows: the second-round expanded area of area F is the area corresponding to 144, the third-round expanded area of area F is the area corresponding to 155, the differential signal corresponding to 155 is H=155−128=27, but the area corresponding to 155 is the expanded area of area E, so if the differential signal corresponding to the expanded area of the second sensing unit is greater than the touch threshold and the expanded area of the second sensing unit is located within the expanded area of the other second sensing unit, the expansion of the area where the second sensing unit is located is stopped, and the expansion stop condition of the third touch area is obtained, where the upper boundary of area F can only be expanded to the area corresponding to 144.

In the embodiment of the present application, the method for expanding the area where the third sensing unit is located to obtain the fourth touch area is the same as the method for expanding the area where the second sensing unit is located to obtain the third touch area, and will not be repeated here.

The method provided in the embodiments of the present application for expanding the area where the third sensing unit is located and expanding the area where the second sensing unit is located can quickly and accurately obtain the third touch area and the fourth touch area through the preset expansion stop condition, thereby further improving the efficiency and accuracy of positioning the target touch area.

Step 204: The processing unit combines the third touch area and the fourth touch area to obtain a target touch area.

In the embodiment of the present application, the third touch area is obtained by expanding the area where the second sensing unit is located, the fourth touch area is obtained by expanding the area where the third sensing unit is located, the differential signal corresponding to the second sensing unit is the maximum differential signal (positive) in the first touch area, and the differential signal corresponding to the third sensing unit is the minimum differential signal (negative) in the second touch area. According to the principle of capacitive touch sensing, when the sensing units in the capacitive sensing array are touched, the differential signals obtained by the processing unit include positive and negative differential signals. The third touch area is determined based on the positive differential signal, the fourth touch area is determined based on the negative differential signal, each third touch area corresponds to a most matching fourth touch area, and the embodiment of the present application combines the third touch area and the most matching fourth touch area to determine the target touch area.

Figure 11:
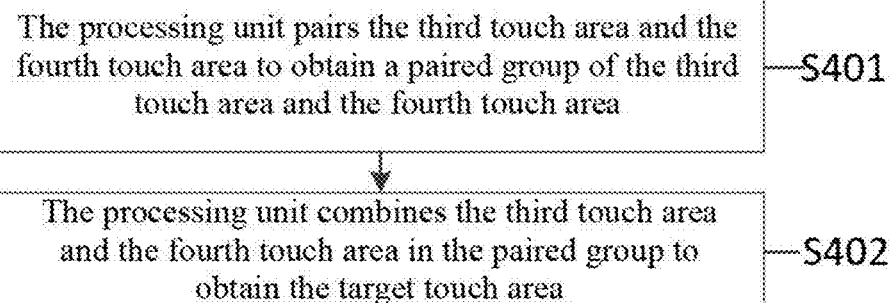
FIG. 11 is a schematic flowchart of a method for obtaining a target touch area provided in an embodiment of the present application.

Refer to FIG. 11, which is a schematic flowchart of a method for obtaining a target touch area provided in an embodiment of the present application. An executing entity of the method in FIG. 11 may be the processing unit in FIG. 1. As shown in FIG. 11, the method includes: S401 to S402.

S401: The processing unit pairs the third touch area and the fourth touch area to obtain a paired group of the third touch area and the fourth touch area.

Specifically, when the sensing units in the capacitive sensing array are touched, a plurality of third touch areas and a plurality of fourth touch areas are determined based on the differential signals. Each third touch area is paired with the plurality of fourth touch areas separately, and the best pair is taken as the paired group of the third touch area and the fourth touch area.

Figure 13:
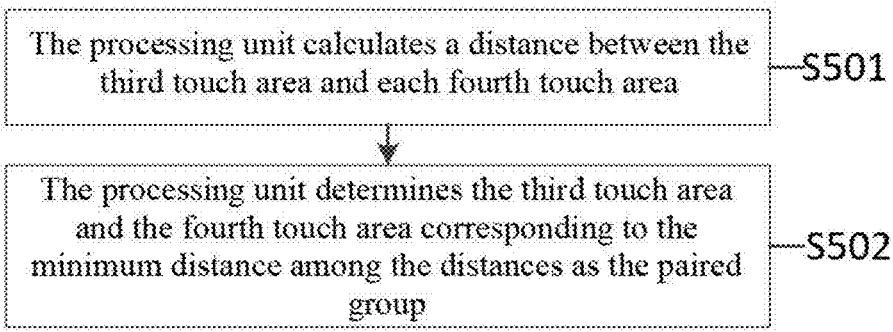
FIG. 13 is a schematic flowchart of a method for determining a paired group provided in an embodiment of the present application.

Refer to FIG. 13, which is a schematic flowchart of a method for determining a paired group provided in an embodiment of the present application. An executing entity of the method in FIG. 13 may be the processing unit in FIG. 1. As shown in FIG. 13, the method includes: S501 to S502.

Step 501: The processing unit calculates a distance between the third touch area and each fourth touch area.

Specifically, when the processing unit pairs the third touch area with the fourth touch areas separately, firstly, the upper and lower boundaries of the third touch area are compared with those of the fourth touch areas separately to determine the fourth touch areas having the same upper and lower boundaries as the third touch area.

Secondly, the distance between the third touch area and each of the fourth touch areas having the same upper and lower boundaries as the third touch area is calculated. The distance in the embodiment of the present application represents the amount of space between the third touch area and the fourth touch area According to the embodiment of the present application, the distance between the third touch area and each fourth touch area can be calculated based on the boundary position of the third touch area and the boundary position of the fourth touch area.

Figure 14:
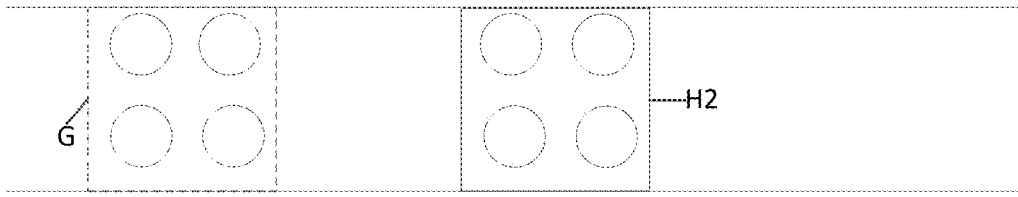
FIG. 14 is a view of an example of calculating a distance between a third touch area and a fourth touch area provided in an embodiment of the present application.

For example, refer to FIG. 14, which is a view of an example of calculating a distance between a third touch area and a fourth touch area in an embodiment of the present application. In FIG. 14, area G represents the third touch area, and H2 represents any one of the fourth touch areas. The upper and lower boundaries of H2 are the same as those of G. The distance between the third touch area and the fourth touch area can be calculated based on the position of the right boundary of area G and the left boundary of area H2.

In other embodiments, the distance between the third touch area and each fourth touch area is calculated based on the row and column numbers of the third touch area and the fourth touch area.

For example, if the third touch area is the area enclosed by the boundaries of the second row, fourth row, third column, and fifth column, and the fourth touch area is the area enclosed by the boundaries of the second row, fourth row, seventh column, and ninth column, the distance between the third touch area and the fourth touch area can be calculated by calculating the distance between the fifth column and the seventh column. In the embodiments of the present application, if the distance between the fifth column and the seventh column is only one column width, the column width is taken as the distance between the third touch area and the fourth touch area.

In other embodiments, if the best pair with the third touch area fails to be determined from the fourth touch areas having the same upper and lower boundaries as the third touch area when the third touch area is paired with each fourth touch area, the fourth touch areas that do not have the same upper and lower boundaries as the third touch area are taken as candidate pairs.

S502: The processing unit determines the third touch area and the fourth touch area corresponding to the minimum distance among the distances as the paired group.

In the embodiment of the present application, the method for determining the third touch area and the fourth touch area corresponding to the minimum distance among the distances as the paired group is as follows.

Firstly, whether there is an overlap area between the third touch area and the fourth touch area is determined; and if there is an overlap area between the third touch area and the fourth touch area, the fourth touch area is taken as a candidate pair with the third touch area.

In the embodiment of the present application, whether there is an overlap area between the third touch area and the fourth touch area can be determined by the distance between the third touch area and the fourth touch area. For example, if the difference between the boundary position of the third touch area and the boundary position of the fourth touch area is less than or equal to 0, there is an overlap area between the third touch area and the fourth touch area; otherwise, there is no overlap area.

In the embodiment of the present application, if there is no overlap area between the third touch area and the fourth touch area, the distance between the third touch area and the fourth touch area is taken as the minimum distance, and the third touch area and the fourth touch area are determined as the paired group.

In the embodiment of the present application, when the distance between the third touch area and the fourth touch area is taken as the minimum distance, the second area in each fourth touch area is randomly or sequentially selected. If there is an overlap area between the third touch area and the second area, the second area is taken as a candidate for being paired with the third touch area, and the third touch area and the fourth touch area are further determined as the paired group. The second area is any touch area in each fourth touch area except the paired fourth touch areas.

In the embodiment of the present application, if there is no overlap area between the third touch area and the second area, the distance between the third touch area and the second area is calculated. If the distance between the third touch area and the second area is less than the distance between the third touch area and the paired fourth touch area, the distance between the third touch area and the second area is taken as the minimum distance, and the third touch area and the second area are determined as the paired group. By this method, whether there is an overlap area between each fourth touch area and the third touch area is determined and the distances between the fourth touch areas each and the third touch area are compared to ultimately determine the optimal paired group.

Figure 15:
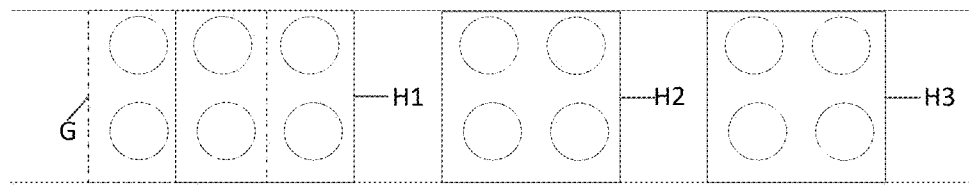
FIG. 15 is an exemplary view of a paired group provided in an embodiment of the present application.

For example, refer to FIG. 15, which is an exemplary view of a paired group provided in an embodiment of the present application. In FIG. 15, area G represents the third touch area, and H1, H2, and H3 all represent the fourth touch areas. The upper and lower boundaries of H1, H2, and H3 are the same as those of G, H1 and G have an overlap area, and the distance between G and H2 is less than that between G and H3. Therefore, G and H2 are determined as the optimal paired group.

In the embodiment of the present application, if a third touch area fails to form a paired group with any one of the fourth touch areas, and a fourth touch area fails to form a paired group with any one of the third touch areas, the unpaired third touch area is paired with an alternative pair to form a paired group, or the unpaired third touch area is paired with the unpaired fourth touch area to form a paired group.

By using the pairing method in the embodiment of the present application, a optimal fourth touch area can be accurately matched with the third touch area, and a pair can be found for the third touch area or the fourth touch area that fails in matching to obtain a paired group, thereby improving the efficiency of pairing and further improving the efficiency of positioning the target touch area.

S402: The processing unit combines the third touch area and the fourth touch area in the paired group to obtain the target touch area.

Specifically, the processing unit takes outermost boundaries of the third touch area and the fourth touch area in the paired group as boundaries of the target touch area, to complete the combination of the paired group.

Figure 12:
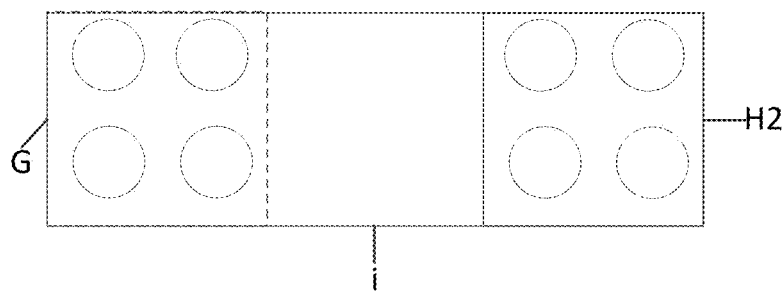
FIG. 12 is an exemplary view of a target touch area provided in an embodiment of the present application.

For example, refer to FIG. 12, which is an exemplary view of a target touch area provided in an embodiment of the present application. In FIG. 12, the processing unit takes the upper and lower boundaries of area G and area H2 in the optimal paired group as upper and lower boundaries of the target touch area i, determines the left boundary of area G as a left boundary of area i, and determines the right boundary of area H2 as a right boundary of area i, to finally determine the boundaries of area i and complete the combination of the paired group.

The combining method in the embodiment of the present application is used for the combination of the paired group based on boundary positions, the third touch area and the fourth touch area can be combined more accurately based on the boundary positions, thereby improving the accuracy of the combined areas and further improving the accuracy of positioning the target touch area.

In summary, according to the technical solution of the present application, a first touch area and a second touch area are determined based on differential signals of first sensing units and a preset touch threshold, a second sensing unit and a third sensing unit are determined in the first touch area and the second touch area respectively, the area where the second sensing unit is located and the area where the third sensing unit is located are expanded separately to obtain a third touch area and a fourth touch area, and the third touch area and the fourth touch area are combined to obtain a target touch area. That is, according to the technical solution of the present application, the first touch area and the second touch area are determined based on the differential signals of the first sensing units and the preset touch threshold, the first touch area includes the first sensing units having positive differential signals greater than the touch threshold, and the second touch area includes the first sensing units having negative differential signals with absolute values greater than the touch threshold, so a plurality of first sensing units having differential signals greater than the touch threshold or differential signals with absolute values greater than the touch threshold can be identified; and the target touch area is obtained by combining the third touch area and the fourth touch area, the third touch area is expanded from the second sensing unit corresponding to the maximum differential signal in the first touch area, and the fourth touch area is expanded from the third sensing unit corresponding to the minimum differential signal in the second touch area, so the second sensing unit corresponding to the maximum differential signal in the first touch area and the third sensing unit corresponding to the minimum differential signal in the second touch area can be identified separately, thereby improving the accuracy of touch area positioning results.

It should be understood that the serial number of each step in the above embodiments does not mean an order of execution, and the order of execution of each process should be determined by the function and internal logic of the process and should not constitute any limitation on the implementation process of the embodiments of the present application.

Figure 16:
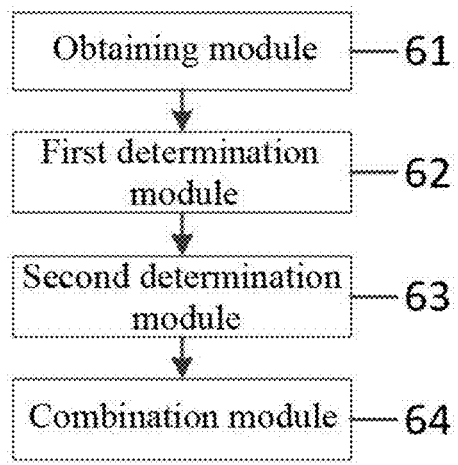
FIG. 16 is a schematic structural view of a positioning apparatus for a touch area provided in an embodiment of the present application.

Refer to FIG. 16, which is a schematic structural view of a positioning apparatus for a touch area provided in an embodiment of the present application. The apparatus includes:

an obtaining module 61, configured to obtain differential signals of first sensing units;

a first determination module 62, configured to determine a first touch area and a second touch area based on the differential signals and a preset touch threshold, where the first touch area is an area corresponding to the first sensing units having positive differential signals greater than the touch threshold, and the second touch area is an area corresponding to the first sensing units having negative differential signals with absolute values greater than the touch threshold;

a second determination module 63, configured to determine a second sensing unit corresponding to the maximum differential signal in the first touch area, expand the area where the second sensing unit is located to obtain a third touch area, determine a third sensing unit corresponding to the minimum differential signal in the second touch area, and expand the area where the third sensing unit is located to obtain a fourth touch area; and a combination module 64, configured to combine the third touch area and the fourth touch area to obtain a target touch area.

The second determination module 63 is further configured to determine, based on the position of the second sensing unit in the capacitive sensing array, an expansion direction for expanding the area where the second sensing unit is located;

expand in the expansion direction the area where the second sensing unit is located, to obtain an expanded area of the second sensing unit; and stop expanding the area where the second sensing unit is located if the differential signal corresponding to the expanded area of the second sensing unit satisfies a preset expansion stop condition, to obtain the third touch area.

The second determination module 63 is further configured to stop expanding the area where the second sensing unit is located if the differential signal corresponding to the expanded area of the second sensing unit is less than the touch threshold, to obtain the third touch area.

The second determination module 63 is further configured to stop expanding the area where the second sensing unit is located if the differential signal corresponding to the expanded area of the second sensing unit is less than the touch threshold, to obtain the third touch area, including:

stop expanding the area where the second sensing unit is located if the differential signal corresponding to the expanded area of the second sensing unit is greater than the touch threshold and the expanded area of the second sensing unit is located within the expanded area of other second sensing unit, to obtain the third touch area.

The area where the second sensing unit is located is expanded in rounds, and the second determination module 63 is further configured to stop expanding the area where the second sensing unit is located if the differential signal corresponding to the expanded area of the second sensing unit is greater than the touch threshold, the expanded area of the second sensing unit is located within the expanded area of the other second sensing unit, and a first target differential signal is less than a second target differential signal, to obtain the third touch area, where the first target differential signal is a differential signal corresponding to the last-round expanded area of the second sensing unit, and the second target differential signal is a differential signal corresponding to the last-round expanded area of the other second sensing unit.

The combination module 64 is configured to pair the third touch area and the fourth touch area to obtain a paired group of the third touch area and the fourth touch area; and combine the third touch area and the fourth touch area in the paired group to obtain the target touch area.

There are a plurality of fourth touch areas, and the combination module 64 is further configured to calculate distances between the third touch area and the fourth touch areas each; and determine the third touch area and the fourth touch area corresponding to the minimum distance among the distances as the paired group.

A person skilled in the art can clearly understand that, for the purpose of convenient and brief description, division of the above functional units or modules is merely used as an example for description. In actual application, the above functions can be allocated to different functional units or modules for implementation according to needs, that is, an internal structure of the apparatus is divided into different functional units or modules to implement all or some of the functions described above. The functional units or modules in the embodiments may be integrated into one processing unit, or each of the units can exist alone physically, or two or more units may be integrated into one unit. The integrated unit may be implemented in a form of hardware, or may be implemented in a form of a software function unit. In addition, specific names of the functional units or modules are merely for convenience of distinguishing from each other, and are not intended to limit the protection scope of the present application. For specific working processes of units or modules in a system described above, refer to corresponding processes in the foregoing method embodiments. Details are not described herein again.

Figure 17:
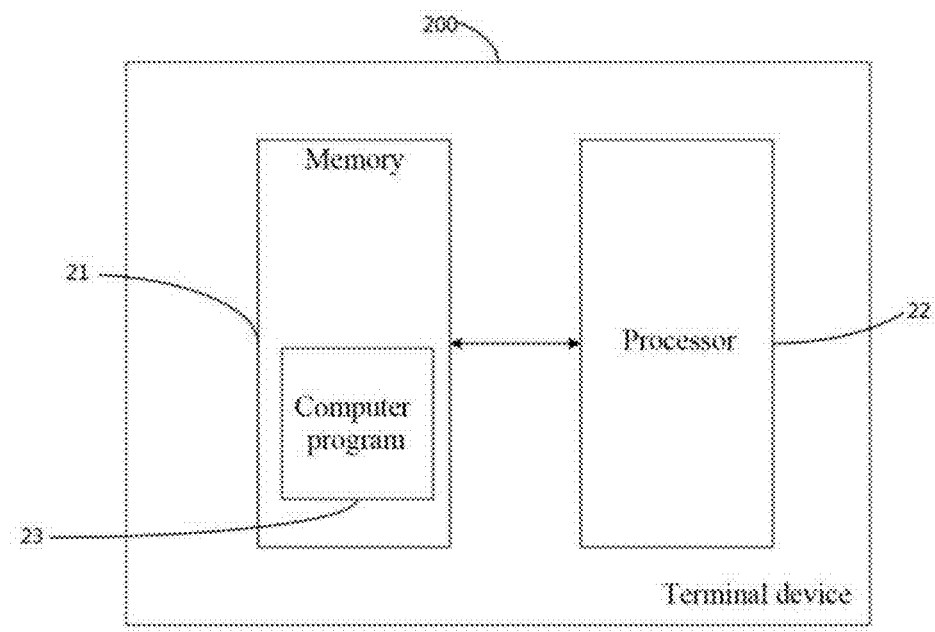
FIG. 17 is a schematic structural view of a terminal device provided in an embodiment of the present application.

As shown in FIG. 17, embodiments of the present application further provide a terminal device 200, including a memory 21, a processor 22, and a computer program 23 stored in the memory 21 and executable on the processor 22. When the processor 22 executes the computer program 23, the positioning method for a touch area in the above embodiments is implemented.

The processing unit 22 may be a central processing unit (CPU), or other general-purpose processor, digital signal processor (DSP), application specific integrated circuit (ASIC), field-programmable gate array (FPGA), or other programmable logic device, discrete gate or transistor logic device, discrete hardware component, or the like. The general-purpose processor may be a microprocessor, or the processor may be any conventional processor or the like.

The memory 21 may be an internal storage unit of the terminal device 200. The memory 21 may also be an external storage device of the terminal device 200, such as a plug-in hard drive, a smart media card (SMC), a secure digital (SD) card, or a flash card, equipped on the terminal device 200. Further, the memory 21 may further include both an internal storage unit of the terminal device 200 and an external storage device. The memory 21 is configured to store the computer program and other programs and data required by the terminal device 200. The memory 21 may be further configured to temporarily store data that has been or will be output.

Embodiments of the present application further provide a computer-readable storage medium, storing a computer program that, executed by a processor, implements the positioning method for a touch area in the above embodiments.

Embodiments of the present application provide a computer program product that, when run on a mobile terminal, enables the mobile terminal to execute the positioning method for a touch area in the above embodiments.

When the integrated unit is implemented in the form of a software function unit and is sold or used as an independent product, the integrated unit may be stored in a computer-readable storage medium. Based on such an understanding, all or some of the processes of the method in the above embodiments of the present application can be implemented by a computer program instructing relevant hardware. The computer program may be stored in the computer-readable storage medium. When the computer program is executed by a processor, the steps of the method of the embodiments above can be implemented. The computer program includes computer program code, and the computer program code may be in a form of source code, object code, or an executable file, or in some intermediate forms, or the like. The computer-readable storage medium may include at least: any entity or apparatus capable of carrying computer program code to a camera/terminal device, recording medium, computer memory, read-only memory (ROM), random access memory (RAM), electrical carrier signals, telecommunications signals, and software distribution medium, such as a U disk, a mobile hard disk, a magnetic disk, or an optical disk. In some jurisdictions, the computer-readable storage medium cannot be electrical carrier signals or telecommunications signals according to the legislation and patent practice.

In the foregoing embodiments, the descriptions of various embodiments have respective focuses. For a part that is not described or recorded in detail in an embodiment, reference may be made to related descriptions in other embodiments.

Those of ordinary skill in the art can realize that the units and algorithmic steps of each example described in combination with the embodiments disclosed herein may be implemented by electronic hardware, or a combination of computer software and electronic hardware. Whether the functions are performed by hardware or software depends on particular applications and design constraints of the technical solutions. A person skilled in the art can use a different method for each specific application to implement the described functions, but the embodiment is not beyond the scope of the present application.

The units described as separate parts may or may not be physically separated, and the parts displayed as units may or may not be physical units, may be located in one position, or may be distributed on a plurality of network units. Some or all of the units may be selected based on actual needs to achieve the objectives of the solutions in the embodiments of the present application.

The above embodiments are only used for illustrating the technical solutions of the present application, rather than limiting them. Although the present application is described in detail with reference to the foregoing embodiments, those of ordinary skill in the art should understand that they still can make modifications to the technical solutions described in the foregoing embodiments or make equivalent replacements to some technical features therein; and these modifications or replacements do not make the essences of the corresponding technical solutions depart from the scope of the technical solutions of the embodiments of the present application.

What is claimed is:

1. A positioning method for a touch area, comprising:
   obtaining differential signals of first sensing units;
   determining a first touch area and a second touch area based on the differential signals and a preset touch threshold, wherein the first touch area is an area corresponding to the first sensing units the differential signals of which are positive in value and greater than the touch threshold, and the second touch area is an area corresponding to the first sensing units the differential signals of which are negative in value and have absolute values greater than the touch threshold;
   determining a second sensing unit corresponding to a maximum one of the differential signals in the first touch area, expanding an area where the second sensing unit is located to obtain a third touch area, determining a third sensing unit corresponding to a minimum one of the differential signals in the second touch area, and expanding an area where the third sensing unit is located to obtain a fourth touch area; and
   combining the third touch area and the fourth touch area to obtain a target touch area.

2. The positioning method according to claim 1, wherein the first sensing units are located in a capacitive sensing array, and the expanding the area where the second sensing unit is located to obtain a third touch area comprises:
   determining, based on a position of the second sensing unit in the capacitive sensing array, an expansion direction for expanding the area where the second sensing unit is located;
   expanding in the expansion direction the area where the second sensing unit is located, to obtain an expanded area of the second sensing unit; and
   stopping expanding the area where the second sensing unit is located if the differential signal corresponding to the expanded area of the second sensing unit satisfies a preset expansion stop condition, to obtain the third touch area.

3. The positioning method according to claim 2, wherein the stopping expanding the area where the second sensing unit is located if the differential signal corresponding to the expanded area of the second sensing unit satisfies a preset expansion stop condition, to obtain the third touch area comprises:

stopping expanding the area where the second sensing unit is located if the differential signal corresponding to the expanded area of the second sensing unit is less than the touch threshold, to obtain the third touch area.

4. The positioning method according to claim 2, wherein the stopping expanding the area where the second sensing unit is located if the differential signal corresponding to the expanded area of the second sensing unit satisfies a preset expansion stop condition, to obtain the third touch area comprises:

stopping expanding the area where the second sensing unit is located if the differential signal corresponding to the expanded area of the second sensing unit is greater than the touch threshold and the expanded area of the second sensing unit is located within an expanded area of another one of the second sensing units, to obtain the third touch area.

5. The positioning method according to claim 4, wherein the area where the second sensing unit is located is expanded in rounds, and the stopping expanding the area where the second sensing unit is located if the differential signal corresponding to the expanded area of the second sensing unit is greater than the touch threshold and the expanded area of the second sensing unit is located within the expanded area of another one of the second sensing units, to obtain the third touch area comprises:

stopping expanding the area where the second sensing unit is located to obtain the third touch area if the differential signal corresponding to the expanded area of the second sensing unit is greater than the touch threshold, and the expanded area of the second sensing unit is located within the expanded area of another one of the second sensing units, and if a first target differential signal is less than a second target differential signal, wherein the first target differential signal is a differential signal corresponding to a last-round expanded area of the second sensing unit, and the second target differential signal is a differential signal corresponding to a last-round expanded area of the another one of the second sensing units.

6. The positioning method according to claim 1, wherein the combining the third touch area and the fourth touch area to obtain a target touch area comprises:

pairing the third touch area and the fourth touch area to obtain a paired group of the third touch area and the fourth touch area; and combining the third touch area and the fourth touch area in the paired group to obtain the target touch area.

7. The positioning method according to claim 6, wherein the area where the third sensing unit is located is expanded to obtain a plurality of the fourth touch areas, and the pairing the third touch area and the fourth touch area to obtain a paired group of the third touch area and the fourth touch area comprises:

calculating distances between the third touch area and the plurality of the fourth touch areas each; and determining the third touch area and one of the plurality of the fourth touch areas corresponding to a minimum distance among the distances as the paired group.

8. A positioning apparatus for a touch area, comprising:
an obtaining module, configured to obtain differential signals of first sensing units;

a first determination module, configured to determine a first touch area and a second touch area based on the differential signals and a preset touch threshold, wherein the first touch area is an area corresponding to some of the first sensing units with positive differential signals greater than the touch threshold, and the second touch area is an area corresponding to some of the first sensing units with negative differential signals, absolute values of which are greater than the touch threshold;

a second determination module, configured to determine a second sensing unit corresponding to a maximum one of the differential signals in the first touch area, expand the area where the second sensing unit is located to obtain a third touch area, determine a third sensing unit corresponding to a minimum one of the differential signals in the second touch area, and expand the area where the third sensing unit is located to obtain a fourth touch area; and a combination module, configured to combine the third touch area and the fourth touch area to obtain a target touch area.

9. The positioning apparatus according to claim 8, wherein the second determination module is further configured to determine, based on a position of the second sensing unit in the capacitive sensing array, an expansion direction for expanding the area where the second sensing unit is located;

expand in the expansion direction the area where the second sensing unit is located, to obtain an expanded area of the second sensing unit; and stop expanding the area where the second sensing unit is located if the differential signal corresponding to the expanded area of the second sensing unit satisfies a preset expansion stop condition, to obtain the third touch area.

10. The positioning apparatus according to claim 9, wherein the second determination module is further configured to stop expanding the area where the second sensing unit is located if the differential signal corresponding to the expanded area of the second sensing unit is less than the touch threshold, to obtain the third touch area.

11. The positioning apparatus according to claim 9, wherein the second determination module is further configured to stop expanding the area where the second sensing unit is located if the differential signal corresponding to the expanded area of the second sensing unit is less than the touch threshold, to obtain the third touch area, comprising:

stop expanding the area where the second sensing unit is located if the differential signal corresponding to the expanded area of the second sensing unit is greater than the touch threshold and the expanded area of the second sensing unit is located within the expanded area of another second sensing unit, to obtain the third touch area.

12. The positioning apparatus according to claim 11, wherein the area where the second sensing unit is located is expanded in rounds; and the second determination module is further configured to stop expanding the area where the second sensing unit is located if the differential signal corresponding to the expanded area of the second sensing unit is greater than the touch threshold, the expanded area of the second sensing unit is located within the expanded area of the another second sensing unit, and a first target differential signal is less than a second target differential signal, to obtain the third touch area, wherein the first target differential signal is one of the differential signals corresponding to a last-round expanded area of the second sensing unit, and the second target differential signal is one of the differential signals corresponding to the last-round expanded area of the other second sensing unit.

13. The positioning apparatus according to claim 8, wherein the combination module is configured to: pair the third touch area and the fourth touch area to obtain a paired group of the third touch area and the fourth touch area; and combine the third touch area and the fourth touch area in the paired group to obtain the target touch area.

14. The positioning apparatus according to claim 13, wherein the area where the third sensing unit is located is expanded to obtain a plurality of fourth touch areas, and the combination module is further configured to: calculate distance between the third touch area and each of the fourth touch areas; and determine the third touch area and one of the fourth touch areas corresponding to a minimum distance among the distances as the paired group.

15. A terminal device, comprising a memory, a processor, and a computer program stored in the memory and executable on the processor, wherein the processor executes the computer program to implement a positioning method for a touch area, comprising:

obtaining differential signals of first sensing units;

determining a first touch area and a second touch area based on the differential signals and a preset touch threshold, wherein the first touch area is an area corresponding to the first sensing units the differential signals of which are positive in value and greater than the touch threshold, and the second touch area is an area corresponding to the first sensing units the differential signals of which are negative in value and have absolute values greater than the touch threshold;

determining a second sensing unit corresponding to a maximum one of the differential signals in the first touch area, expanding an area where the second sensing unit is located to obtain a third touch area, determining a third sensing unit corresponding to a minimum one of the differential signals in the second touch area, and expanding an area where the third sensing unit is located to obtain a fourth touch area; and combining the third touch area and the fourth touch area to obtain a target touch area.

\* \* \* \* \*